United States Patent
Eick et al.

(10) Patent No.: US 9,291,728 B2
(45) Date of Patent: Mar. 22, 2016

(54) CONTINUOUS SEISMIC ACQUISITION

(75) Inventors: Peter M. Eick, Houston, TX (US); Joel D. Brewer, Houston, TX (US); Stephen K. Chiu, Katy, TX (US)

(73) Assignee: ConocoPhillips Company, Houston, TX (US)

(*) Notice: Subject to any disclaimer, the term of this patent is extended or adjusted under 35 U.S.C. 154(b) by 1004 days.

(21) Appl. No.: 13/452,989

(22) Filed: Apr. 23, 2012

(65) Prior Publication Data

US 2012/0281499 A1  Nov. 8, 2012

Related U.S. Application Data

(60) Provisional application No. 61/483,332, filed on May 6, 2011.

(51) Int. Cl.
*G01V 1/00*  (2006.01)
*G01V 1/37*  (2006.01)

(52) U.S. Cl.
CPC .. *G01V 1/005* (2013.01); *G01V 1/37* (2013.01)

(58) Field of Classification Search
CPC ................... G01V 1/005; G01V 1/37
See application file for complete search history.

(56) References Cited

U.S. PATENT DOCUMENTS

| | | | | |
|---|---|---|---|---|
| 8,813,840 B2 * | 8/2014 | Zupanick | ................... | 166/245 |
| 2006/0164916 A1 * | 7/2006 | Krohn | ................... | G01V 1/005 367/41 |
| 2011/0128818 A1 | 6/2011 | Eick et al. | | |

* cited by examiner

*Primary Examiner* — Krystine Breier
(74) *Attorney, Agent, or Firm* — ConocoPhillips Company

(57) ABSTRACT

The invention relates to a seismic acquisition process where multiple seismic sources are used to acquire seismic energy using encoding so that all of the sources may deliver seismic energy at the same time where the sweeps are arranged to be back to back with no listen time and wherein a pseudo listen time that is uncontaminated is created in the composite data record. After the listen time is created, the composite data may be source separated for further processing and analysis.

5 Claims, 1 Drawing Sheet

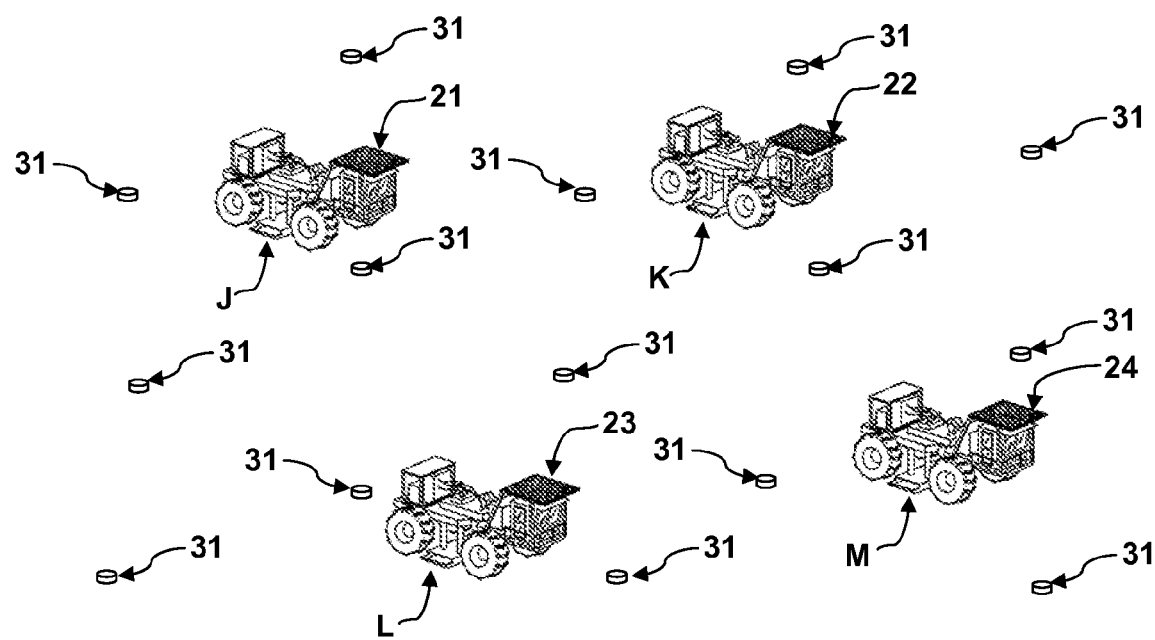

CONTINUOUS SEISMIC ACQUISITION

CROSS-REFERENCE TO RELATED APPLICATIONS

This application is a non-provisional application which claims benefit under 35 USC §119(e) to U.S. Provisional Application Ser. No. 61/483,332 filed May 6, 2011, entitled "CONTINUOUS SEISMIC ACQUISITION," which is incorporated herein in its entirety.

STATEMENT REGARDING FEDERALLY SPONSORED RESEARCH OR DEVELOPMENT

None.

FIELD OF THE INVENTION

This invention relates to seismic prospecting for hydrocarbon resources and especially to acquisition of seismic data using sweep-type seismic sources.

BACKGROUND OF THE INVENTION

The acquisition of seismic data is an expensive undertaking and any time savings can amount to significant cost savings. One significant time saver has been the development of phase separated seismic prospecting which makes it possible to acquire seismic data from a number of shot points simultaneously to increase the number of shot points shaken in a day and ultimately substantially reduces the number of days to acquire the data for a survey area. While the amount of time that the vibes spend at a single shot point is longer, at the end of the series of sweeps, several shot points have been "completed" and the vibes move on to another setup of shot points to shake.

US Published Patent Application 2006/0164916A1 has suggested an interesting time saving plan where the listen time associated with sweep style seismic prospecting especially with phase-encoded, multiple source surveying, characterizing the procedure as using continuous sweeps with little or no "listening" time between sweeps. In reviewing the procedure proposed, a listen time is provided at the end of the sweeps. This eliminates or reduces the time in which the vibes are sitting and waiting between sweeps. While such listen time is not long in that it lasts from about four seconds to about 12 seconds between each sweep. Thus, for four sweeps, it adds about 12 seconds to about one minute for each setup. However, considering the costs associated with a survey, eliminating the time delay for listening may allow several dozen setups to be accomplished per day. Such setups may reduce the total time for an entire survey by one or two days to a week. At tens of thousands of dollars per day of surveying, this small efficiency improvement can provide considerable cost advantage over current systems.

BRIEF SUMMARY OF THE DISCLOSURE

The invention more particularly includes a process for acquiring seismic data in a seismic survey comprising a large plurality of shot points and a large plurality of receiver points wherein multiple sweep style seismic sources are arranged such that each source is positioned at a separate shot point and the sources are delivering seismic energy into the earth concurrently while receivers are arranged to record seismic signals reflected back from the earth to the surface to create a composite data record of energy from the sources. The process includes the sources delivering at each shot point at least the number of sweeps of seismic energy as there are sources that are commonly delivering seismic energy into the earth used in the survey where the sweeps are delivered continuously with no listen time between each sweep. A pseudo listen time is created in the composite data record using a frequency band pass filter based method.

In one embodiment, a frequency band pass filter is designed to attenuate the frequencies of the next activated sources activated during the pseudo listen time and said band pass filter is applied to the pseudo listen time to attenuate the contaminating energy. The frequency band pass filter may attenuate the frequencies of the next activated sources activated during the pseudo listen time taking into consideration the next activated source and receiver pair, wherein the location and start time of each next activated source is utilized with each active receiver to design a specific time varying frequency band pass filter specifically for the next activated source and receiver pair, and wherein the band pass filter is used during the pseudo listen time to attenuate the contaminating energy.

In another embodiment, the frequency band pass filter may attenuate all frequencies not present in the next activated sources activated during the pseudo listen time such that the frequency band pass filter is applied to the pseudo listen time so that only next source activation contaminating energy remains wherein the resulting contaminated energy listening time record is then subtracted from the original extracted pseudo listen time to attenuate the next source activation contaminating energy. The data may have frequency band pass filtering such that the filtering is designed to attenuate the frequencies of the next activated sources activated during the pseudo listen time and said band pass filter is applied to the pseudo listen time to attenuate the contaminating energy.

In yet another embodiment, a frequency band pass filter may attenuate the frequencies of the next following sweep of the sources. The frequency band pass filter may follow a time and frequency progression that allows the desired and expected frequencies and attenuates other frequencies such that the attenuated frequencies are a different wavelength depending on the lapsed time following the start of sweep.

BRIEF DESCRIPTION OF THE DRAWINGS

A more complete understanding of the present invention and benefits thereof may be acquired by referring to the follow description taken in conjunction with the accompanying drawings in which:

FIG. 1 is perspective view of four sweep-style seismic vibrators delivering seismic energy into the ground while receivers are deployed to receive the seismic echoes from underground substructures.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

In the present invention, a seismic survey is accomplished with a phase encoded seismic survey team as shown in FIG. 1 with four vibes 21, 22, 23 and 24 each sitting on shot points J, K L and M while a plurality of receivers 31 are set to record the signals arriving back to the surface. The data recorded at each receiver includes the energy from each of the shot points J, K, L, and M. Thus, four shot points are surveyed at the same time and the phase encoding of each source provides for subsequent separation of the data so that interpretations of the subsurface geology may be made based on data from each shot point to each receiver point. The goal of phase encoded seismic surveying is to create the same data set as acquired by a conventional seismic survey team, but in significantly less time. Thus, it should be noted that with four vibes on one shot point essentially puts approximately four times the energy into the ground in a set period of time as one vibe. Thus, in the phase encoded survey, the vibes spend considerably more time delivering energy into the ground at each shot point than in the four vibe on one shot point case. Typically, a phase encoded seismic survey team will deliver four sweeps of comparable length in time as a conventional survey team will deliver. Simply stated, if a conventional survey were to have four vibes provide a common 10 second sweep of energy for each shot point, a phase encoded seismic survey team would have each vibe deliver four 10 seconds sweeps or 40 total seconds of energy. The typical design of the sweep length to be used is more involved than the simple example above since it is typical to evaluate existing seismic data in the area to try and avoid overdesigning the length of the sweep. In addition to the sweep length there is also the listening time to be added after each sweep is finished.

However, in contrast to conventional phase encoded systems, each of the sweeps in the present invention do not include a listening time at the end or between each sweep. The present invention uses a method of frequency filtering to create an uncontaminated pseudo listen period from the continuous record of signals received by each receiver 31 so that continuous seismic acquisition is possible. Note that this assumes that the recording in the field is continuous and that the data records after filtering each comprise a record having a time duration of a sweep length plus a desired listening time that is extracted. Each data record starts at the zero time or start time of each sweep. The band pass frequency filter is implemented during pre-processing of the data set prior to any inversion or separation of the simultaneously recorded sources. The filtering method provides for a seismic survey system utilizing the benefits of phase encoding and continuous sweeps without the requirement that after each sweep there be listen time prior to the start of the next sweep.

Specifically, the US Published Patent Application 2006/0164916A1 requires that each sweep be longer than the expected time for a seismic signal to hit and reflect from the deepest target of interest and report to the receivers within range of receiving the reflected signal. As such, each sweep of the Published Application 2006/0164916A1 method will have a listen time with no activated sweep that is typically from four to 8 seconds. While long sweeps increase the data in the data set for each shot point, eliminating the requirement for an associated listening time when multiple sweeps are delivered back to back may increase time productivity of the survey crew and reduce the cost of the survey.

The present invention takes advantage of the observation that when using a frequency sweep source such as in an up-sweep, where the seismic energy is delivered as a sweep from a low frequency range progressively to high frequency, the energy from the low frequencies inherently return from the geologic interfaces to the receivers before the arrival of the higher frequencies. Thus, a successive sweep may be immediately activated at the end of the first sweep which would ordinarily coincide with the listening time of the first sweep. However, any energy from the succeeding sweep that arrives with the high frequencies of the preceding sweep would not include useful data as those low frequencies would be surface waves and not reflected energy from the subsurface. As such, the low frequencies could be appropriately filtered or attenuated from the data set by a suitable frequency filter. This insight can be applied to the entire sweep such that the appropriate frequency band of the sweep activated during the listening time can be frequency filtered out of the portion of the data set leaving data that is the appropriate frequency for the pertinent listening time without impact to the signal. Basically, the signal from the frequencies at the end of a sweep will be the signals that are recorded during the appropriate listening time but a similar sweep activated during the listening time will still result in a successive signal having the start of a sweep signal and providing two data sets may be extracted from a common time stream of data. One data set is from the first sweep with the second sweep attenuated, and the second data set is from the second sweep with the data from the first sweep attenuated. This may be described as creating a pseudo listen time for each sweep although in real time, additional sweeps were underway.

The frequency filter method operates as follows: (a) arrange for the simultaneous or near simultaneous source sweep of multiple seismic source points in a continuous or near continuous method using a frequency sweep source; (b) continuously recording the source composite seismic data using sensors; (c) extracting a specific raw composite seismic record from the continuous recorded seismic data set where the extraction start time is the start time of a particular sweep and the length is equal to the sweep length plus the desired listening time; (d) designing a frequency band limited filter that covers only the frequency band that is in the portion of the sweep or sweeps that are activated, next source, during the desired listening time of step (c); (e) applying the frequency band limited filter to the portion of the raw extracted composite seismic record that represents the listening time; (f) outputting the resulting composite seismic record; and (g) repeating the foregoing steps for all of the multiple seismic source seismic records.

The results from the application of the invention are source composite seismic records that have a significantly reduced next source activation contamination. The source composite seismic records will contain the energy input from the simultaneous or near simultaneous source activations plus the decontaminated listening time. The appropriate grouping of source composite records can be inverted to separate the composite data from all the source points using the phase encoding data into individual and separate source point data for subsequent geological analysis.

In a second embodiment of the invention the continuous acquisition is made possible by attenuation of the next source energy from the pseudo listening time by adjusting the frequency band pass filters in step (d) for the location and start timing of the next source activation. For each next source and receiver pair there is a specific time varying frequency band pass filter that will attenuate the next source energy contamination. The filters can be applied on a receiver recorded trace by trace basis to create a composite seismic record with a pseudo listening time that has significantly reduced energy contamination from sources activated during the pseudo listening time. The source composite seismic records will contain the energy input from the simultaneous or near simultaneous source activations plus the decontaminated listening time. The appropriate grouping of source composite records can be inverted to separate the composite data from all the source points using the phase encoding data into individual and separate source point data for subsequent geological analysis.

In a third embodiment of the invention the continuous acquisition is made possible by attenuation of the next source energy from the pseudo listening time by a more complex approach. In this approach the next source activation contamination is modeled from the extracted record listening time energy and then subtracted from the listening time thus reducing the next source activation contamination. The basis for the method is the known next source activation locations and the activation timing relative to the extracted record source locations and activation timing. A band pass frequency filter is developed for each next source and receiver pair so that only the next source activation energy remains in the pseudo listening time. The filters are applied so that they start at the time that the second source energy arrives at a particular receiver and filter all frequencies that the second source had not produced during the pseudo listening time. Thus, the filter is a time and frequency varying frequency band pass filter designed for each next source or next sweep that contributes contamination energy to the pseudo listening time. The various filters are applied to the pseudo listening time portion of the extracted record resulting in only a next source energy estimate. This next source estimate is then subtracted from the pseudo listening time to attenuate the next source energy contamination. The source composite seismic records will contain the energy input from the simultaneous or near simultaneous source activations plus the decontaminated listening time. The appropriate grouping of source composite records can be inverted to separate the composite data from all the source points using the phase encoding data into individual and separate source point data for subsequent geological analysis.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for acquiring seismic data in a seismic survey comprising a large plurality of shot points and a large plurality of receiver points wherein multiple sweep-style seismic sources are arranged such that each source is positioned at a separate shot point and the sources are delivering seismic energy into the earth concurrently while receivers are arranged to record seismic signals reflected back from the earth to the surface to create a composite data record of energy from the sources and wherein the process includes the sources delivering at each shot point at least the number of sweeps of seismic energy as there are sources that are commonly delivering seismic energy into the earth used in the survey where the sweeps are delivered continuously with no listen time between each sweep, and further wherein a pseudo listen time is created in the composite data record using a frequency band pass filter based method, where a frequency band pass filter is designed to attenuate the frequencies of the next activated sources activated during the pseudo listen time and said band pass filter is applied to the pseudo listen time to attenuate the contaminating energy.

2. A process for acquiring seismic data in a seismic survey comprising a large plurality of shot points and a large plurality of receiver points wherein multiple sweep-style seismic sources are arranged such that each source is positioned at a separate shot point and the sources are delivering seismic energy into the earth concurrently while receivers are arranged to record seismic signals reflected back from the earth to the surface to create a composite data record of energy from the sources and wherein the process includes the sources delivering at each shot point at least the number of sweeps of seismic energy as there are sources that are commonly delivering seismic energy into the earth used in the survey where the sweeps are delivered continuously with no listen time between each sweep, and further wherein a pseudo listen time is created in the composite data record using a frequency band pass filter based method where a frequency band pass filter is designed to attenuate the frequencies of the next activated sources activated during the pseudo listen time taking into consideration the next activated source and receiver pair, wherein the location and start time of each next activated source is utilized with each active receiver to design a specific time varying frequency band pass filter specifically for the next activated source and receiver pair, and wherein the band pass filter is used during the pseudo listen time to attenuate the contaminating energy.

3. A process for acquiring seismic data in a seismic survey comprising a large plurality of shot points and a large plurality of receiver points wherein multiple sweep-style seismic sources are arranged such that each source is positioned at a separate shot point and the sources are delivering seismic energy into the earth concurrently while receivers are arranged to record seismic signals reflected back from the earth to the surface to create a composite data record of energy from the sources and wherein the process includes the sources delivering at each shot point at least the number of sweeps of seismic energy as there are sources that are commonly delivering seismic energy into the earth used in the survey where the sweeps are delivered continuously with no listen time between each sweep, and further wherein a pseudo listen time is created in the composite data record using a frequency band pass filter based method where a frequency band pass filter is designed to attenuate all frequencies not present in the next activated sources activated during the pseudo listen time such that the frequency band pass filter is applied to the pseudo listen time so that only next source activation contaminating energy remains wherein the resulting contaminated energy listening time record is then subtracted from the original extracted pseudo listen time to attenuate the next source activation contaminating energy.

4. A process for acquiring seismic data in a seismic survey comprising a large plurality of shot points and a large plurality of receiver points wherein multiple sweep-style seismic sources are arranged such that each source is positioned at a separate shot point and the sources are delivering seismic energy into the earth concurrently while receivers are arranged to record seismic signals reflected back from the earth to the surface to create a composite data record of energy from the sources and wherein the process includes the sources delivering at each shot point at least the number of sweeps of seismic energy as there are sources that are commonly delivering seismic energy into the earth used in the survey where the sweeps are delivered continuously with no listen time between each sweep, and further wherein a pseudo listen time is created in the composite data record using a frequency band pass filter based method where a frequency band pass filter is designed to attenuate the frequencies of the next following sweep of the sources.

5. The process according to claim 4 where the frequency band pass filter follows a time and frequency progression that allows the desired and expected frequencies and attenuates other frequencies such that the attenuated frequencies are a different wavelength depending on the lapsed time following the start of sweep.

* * * * *